United States Patent [19]

Muller

[11] Patent Number: 4,578,758

[45] Date of Patent: Mar. 25, 1986

[54] ELECTRONIC POSTAGE METER HAVING A REGULATED POWER SUPPLY SYSTEM RESPONSIVE TO A VOLTAGE DEVELOPED IN A TRANSFORMER PRIMARY WINDING CIRCUIT

[75] Inventor: Arno Muller, Westport, Conn.

[73] Assignee: Pitney Bowes Inc., Stamford, Conn.

[21] Appl. No.: 506,957

[22] Filed: Jun. 23, 1983

[51] Int. Cl.[4] .............................................. G06F 15/20

[52] U.S. Cl. .................................... 364/466; 364/483; 363/21

[58] Field of Search ............... 364/464, 466, 480, 483; 363/19-21, 56-57; 323/355

[56] References Cited

U.S. PATENT DOCUMENTS

| | | | |
|---|---|---|---|
| 3,564,393 | 2/1971 | Williamson | 363/21 |
| 3,978,457 | 8/1976 | Check, Jr. et al. | 364/900 |
| 4,287,825 | 9/1981 | Eckert, Jr. et al. | 101/91 |
| 4,301,507 | 11/1981 | Soderberg et al. | 364/464 |
| 4,335,434 | 6/1982 | Baumann et al. | 364/464 |
| 4,471,440 | 9/1984 | Check, Jr. | 364/466 |
| 4,471,441 | 9/1984 | Check, Jr. | 364/466 |
| 4,472,781 | 9/1984 | Miller | 364/466 |
| 4,481,604 | 11/1984 | Gilham et al. | 364/464 |

*Primary Examiner*—Gary Chin
*Attorney, Agent, or Firm*—David E. Pitchenik; Albert W. Scribner; William D. Soltow, Jr.

[57] ABSTRACT

An electronic postage meter includes a printer mechanism for printing postage and a microcomputer system for monitoring the printing of postage by the printing mechanism. A secure housing protects the printing mechanism and the microcomputer system. A source of operating potential is provided and is external to the secure housing. The electronic postage meter includes a system for energizing the microcomputer system. A transformer is provided and is mounted within the secure housing. The transformer secondary winding is operatively connected to the microcomputer system. A controlling circuit is coupled to the transformer primary winding and also to the external source of operating potential. The controlling circuit controls the voltage applied to the transformer primary winding and operates to switch the voltage applied to the transformer primary winding between a first condition where the transformer primary winding is energized and a second condition where the primary winding is not energized. The controlling circuit includes a circuit for varying the period of time the transformer primary winding is energized and the period of time the primary winding is deenergized. The period varying circuit is operated in response to a voltage established in the transformer primary winding. The controlling circuit includes a terminal which is adapted to be energized by a predetermined source of operating voltage. A step up voltage generating circuit is coupled to the controlling circuit for energizing said terminal at a voltage which is greater than the predetermined voltage.

10 Claims, 2 Drawing Figures

ELECTRONIC POSTAGE METER HAVING A REGULATED POWER SUPPLY SYSTEM RESPONSIVE TO A VOLTAGE DEVELOPED IN A TRANSFORMER PRIMARY WINDING CIRCUIT

FIELD OF THE INVENTION

The present invention relates to electronic postage meter power supply systems and, more particularly, to electronic postage meter isolating type high frequency power supply systems.

BACKGROUND OF THE INVENTION

Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter and is printed by the meter. As a result, postage meters must possess an extremely high reliability to avoid the loss of user or government funds stored within the meter.

Electronic postage meters have been developed with electronic accounting circuitry. Postage meter systems of this type are disclosed in U.S. Pat. No. 3,978,457 for MICROCOMPUTERIZED ELECTRONIC POSTAGE METER SYSTEM; and U.S. Pat. No. 4,301,507 for ELECTRONIC POSTAGE METER HAVING PLURAL COMPUTING SYSTEM. The electronic accounting circuits of the meter include non-volatile memory capability for storing postage accounting information. The memory function in the electronic accounting circuits have replaced the function served in mechanical postage meters by mechanical accounting registers. The non-volatile memory and value selection in the electronic postage meters of the aforementioned patents, as well as other meter functions, are operated under microcomputer control.

Postage meters with mechanical accounting registers are not subject to many of the problems encountered by electronic postage meters. Conditions cannot normally occur in postage meters with mechanical registers that prevent, for example, accounting for a printing cycle or which will result in the loss of data stored in the mechanical registers. This is not the case with electronic postage meters. Electronic postage meters are subject to the effects of electromagnetic radiation which can effect their operation. Thus, precautions must be taken, as for example by proper shielding, to protect the meter's electronic components from the effects of electromagnetic radiation. Mechanical security must, of course, also be provided. It has been recognized that it is desirable to energize electronic postage meters in a manner which eliminates or minimizes the problems associated with electromagnetic radiation. For example, a power supply wherein only the secondary winding is within the meter secure structure is disclosed in U.S. Patent Application Ser. No. 344,651, now Pat. No. 4,471,440, filed Feb. 1, 1982, by Frank T. Check, Jr. for ELECTRONIC POSTAGE METER HAVING POWER MAGNETICALLY COUPLED TO THE METER FROM THE METER BASE. Also, the need for efficient power supplies in electronic postage meters is noted in U.S. Patent Application Ser. No. 306,805, now Pat. No. 4,472,781, filed Sept. 29, 1981, by Roland G. Miller for Power Supply System. Both applications are assigned to Pitney Bowes Inc.

SUMMARY OF THE INVENTION

It has been discovered that an isolating high power supply system can be incorporated within the electronic postage meter itself in a manner which will provide isolation from the effects of electromagnetic radiation and the effects of over voltage or under voltage at the input terminals to the power supply. The structure of the present invention provides the advantages of isolation, with its attendant protection, without the need for an opto-coupler devices to couple back or feedback an input control signal to the primary winding circuit in an isolating manner the voltage level in the secondary winding circuit.

It has been discovered that a power supply system can be provided in an electronic postage meter, within the secure, shielding confined space of the meter housing which does not have opto-coupler feed back from the secondary winding circuit to the primary winding circuit and does not employ a separate feed back component. It has been discovered that during the period of time when the switching regulator transistors are off, such that the primary winding is not energized and the flux in the magnetic core collapses, the voltage developed in the primary winding will be representative of the power condition of the secondary winding and that this fact can be beneficially employed to provide voltage regulation without a separate feedback component coupled between the secondary and primary windings. The information regarding the power condition in the secondary winding circuit obtained by the voltage developed in the primary winding at this time is used in accordance with the present invention as a feedback mechanism to adjust the input power to the primary winding. The nature of the feedback information provided by the voltage developed in the primary winding is dependent upon the ratio of the number of turns of the primary to the secondary. Providing feed back to control the power to the input of the primary winding in this manner, avoids unwanted, spurious signal information from being introduced into the secondary winding circuit via a separate feed back component. This is believed to be particularly important because the power or voltage input to the primary winding circuit is obtained from a terminal which is coupled to a source of operating power outside of the meter housing.

It has also been discovered that by a unique circuit arrangement within the meter secure housing, the power supply controller can be made to operate in a manner which results in power being availabe to drive critical meter functions for a longer period of time during power down conditions.

In an electronic postage meter having a mechanism for printing postage and microcomputer system for monitoring the printing of postage by the printing mechanism, a secure housing structure for protecting the printing mechanism and the microcomputer system, and a source of operating potential external to the secure housing structure, a system for energizing the microcomputer system embodying the present invention includes a transformer having a primary winding and a secondary winding. The transformer is mounted within the secure housing structure with the secondary winding operatively connected to the microcomputer system. A controlling circuit is provided and is coupled to the primary winding and to the external source of operating potential. The controlling circuit operates to control the voltage applied to the primary winding. The controlling circuit switches the voltage applied to said primary winding between a first condition wherein the primary winding is energized and a second condition wherein the primary winding is not energized. The controlling circuit includes a period varying circuit operable to vary the period of time the primary winding is energized and the period of time the primary winding is deenergized. A circuit is coupled between said primary winding and the varying circuit for operating said varying circuit. This circuit causes the varying circuit to vary the period of time the primary winding is energized and the period of time the primary winding is deenergized in response to a voltage established in the primary winding of the transformer during said period of time said transformer is deenergized.

In accordance with a feature of the invention the controlling circuit includes a terminal adapted to be energized by a predetermined source of operating voltage. A voltage step up circuit is coupled to the controlling circuit for energizing the terminal at a voltage which is greater than the predetermined voltage.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DESCRIPTION OF THE PREFERRED EMBODIMENT

Figure 1:
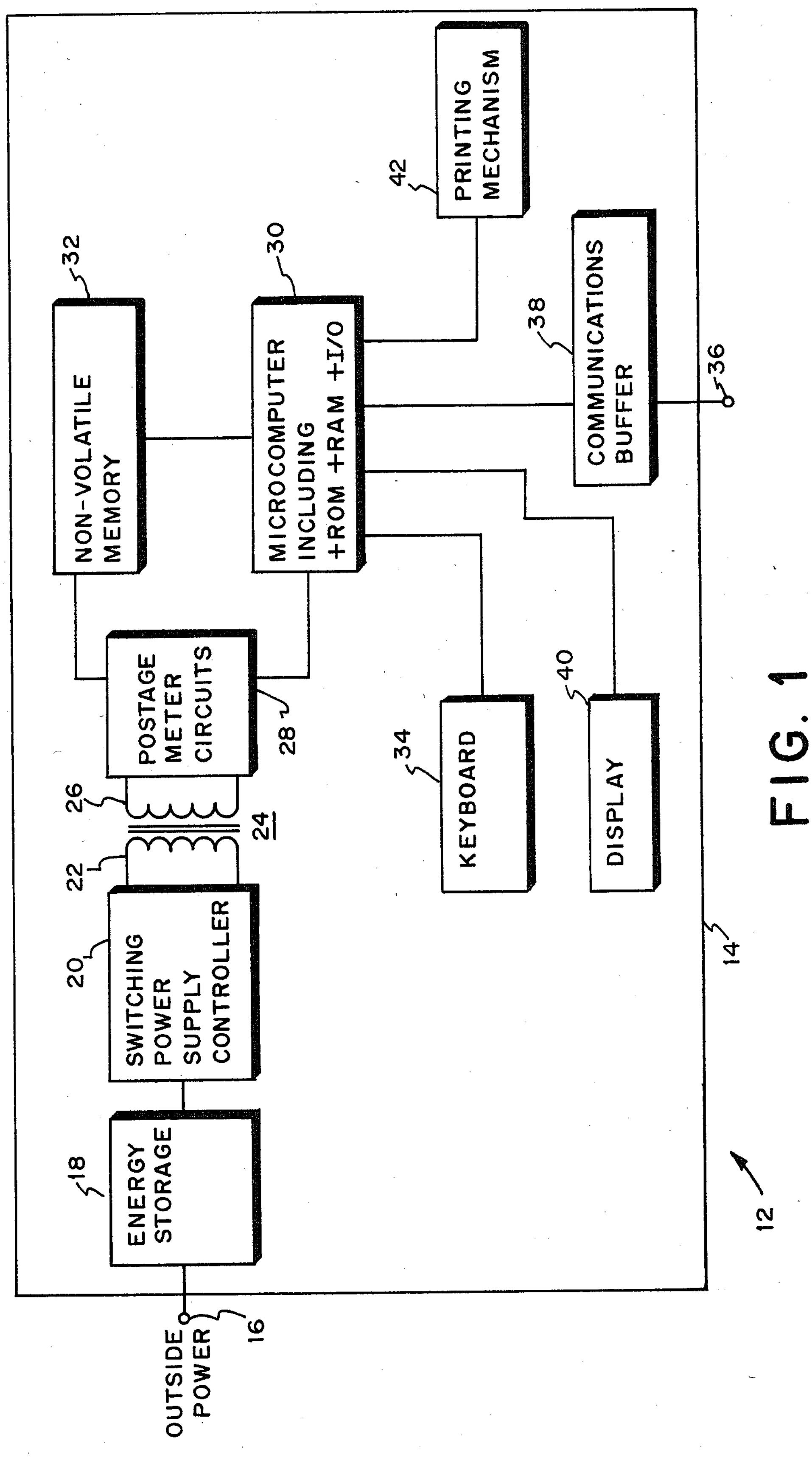
FIG. 1 is a block diagram of an electronic postage meter having an isolating power supply system embodying the present invention.

Reference is now made to FIG. 1. A postage meter 12 includes a secure housing of 14 for providing physical security for the meter. The housing may also provide electro-magnetic shielding for the meter components. Power is supplied to the meter via a terminal 16. Terminal 16 is energized with +24 volts DC. This DC voltage may be generated from a power supply outside the secure meter housing which is in turn energized by a source of 60 hertz, 115 volt AC, or other suitable source of available operating power.

Terminal 16 is coupled to an energy storage device 18 which provides power for the meter components for a predetermined period of time should the external source of operating power at terminal 16 to interrupted. The energy stored in energy storage device 18 is sufficient to allow meter operations in process to be completed and for a critical accounting data, such as the amount of postage printed, the value of the descending meter register or the value ascending meter register, to be transferred from operating to non-volatile memory. The critical nature of these registers is described in the above noted U.S. Patent and application. Energy storage device 18 is coupled to a switching power supply controller 20. The switching power supply controller 20 energizes the primary winding 22 of a transformer 24. The secondary winding 26 of transformer 24 is coupled to the postage meter control and logic circuits 28.

It should be noted that the only form of feedback from the circuits coupled to the primary winding 22 to the switching power supply controller 20 is through the transformer 24. No other form of coupling is provided. Thus, no separate component couples the transformer secondary winding circuit to the transformer primary winding circuit. As a result no feed back component is present which could fail and provide a path from the external power applied at terminal 16 to the remaining portions of the postage meter components such as the microcomputer 30 or the non-volatile memory 32.

The postage meter control and logic circuits 28 are coupled to energize and control the postage meter microcomputer system 30. The microcomputer system 30 includes a microcomputer and related circuits, namely, random access memory, (RAM) read only memory (ROM) and associated input/output (I/O) buffers, and timing circuits. The program resident in the ROM controls the sequence of operation of the microcomputer, and hence, the operation of the meter.

Data may be entered into the postage meter via a keyboard 34 coupled to the microcomputer system 30. Alternatively, data may be entered into the meter through a communications port 36 coupled via an isolating communications buffer 38 to the microcomputer system 30. A display 40 coupled to microcomputer system 30 may also be provided. The display provides a visual indication of data entered into the meter and/or the status of various accounting registers resident in the meter memory components.

A printing mechanism 42 is coupled to the microcomputer 30. The printing mechanism is adapted to print the unit value impressions on a mail piece. A suitable printing mechanism for an electronic postage meter is shown in U.S. Pat. No. 4,287,825 for PRINTING CONTROL SYSTEM.

Figure 2:
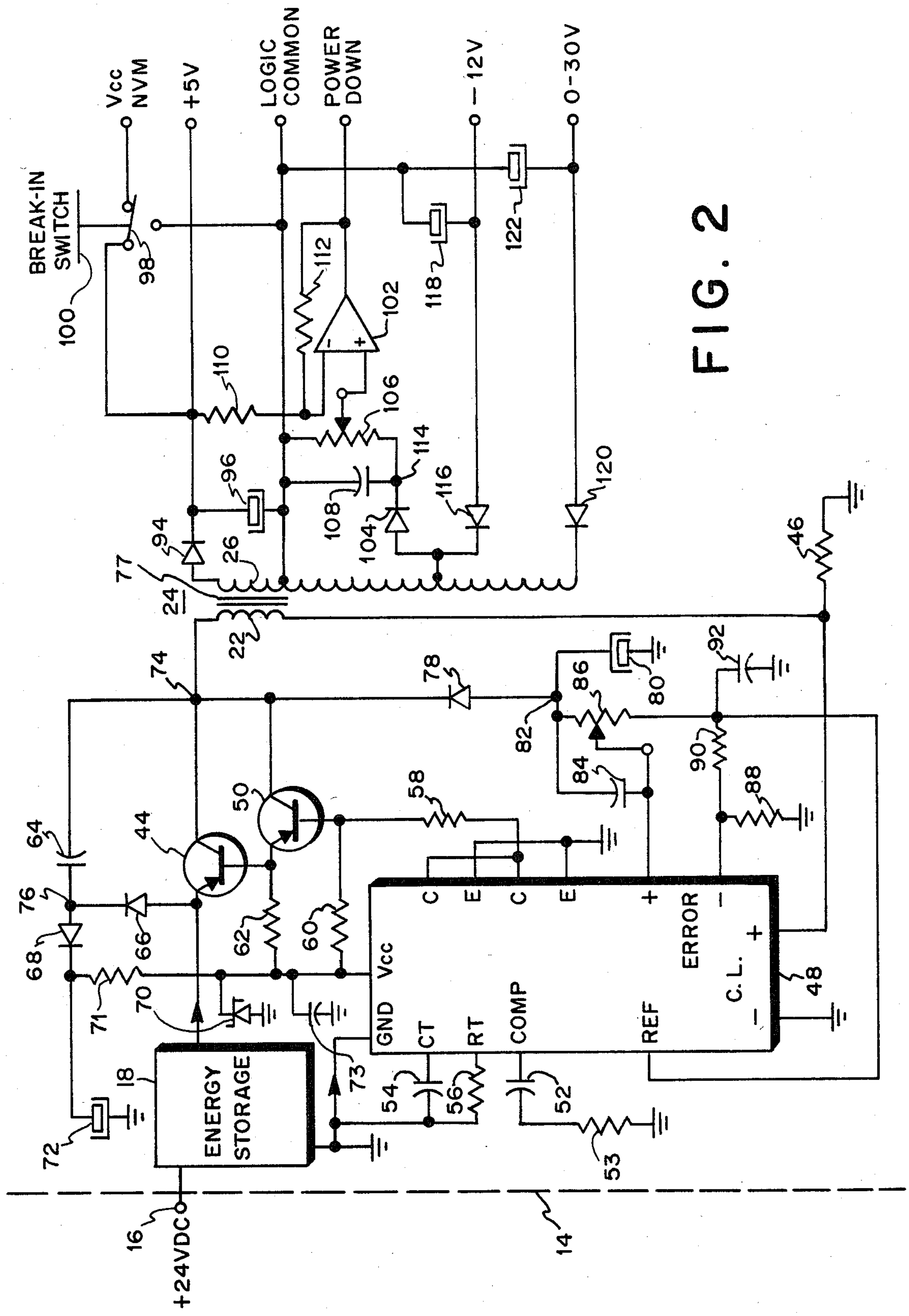
FIG. 2 is a schematic circuit diagram of the isolating power supply system for the electronic postage meter shown in FIG. 1.

Reference is now made to FIG. 2. The switching power supply controller 20, transformer 24 and a portion of the postage meter control and logic circuits 28 are shown in FIG. 2. The switching power supply controller 20 includes a switching power supply controller integrated circuit 48. The device may be a type LM3524 device manufactured by Signetics Corporation or other suitable devices such as those manufactured by Texas Instrument, National Semiconductor and others. The switching supply controller integrated circuit 48 may be manufactured by Signetics Corporation. This device is described in the Signetics Switching Mode Power Supply Control Circuit Manual, printed December 1978.

The +24 volt DC applied at terminal 16 is coupled through the energy store 18 to the emitter electrode of transistor 44. The energy store 18 includes circuits to provide over voltage protection and reverse discharge protection to preclude the energy stored in the device 18 from discharging back through terminal 16. The collector electrode of transistor 44 is connected to one side of the primary winding 22 of transformer 24. The other side of the primary winding 22 is connected via a current limiting resistor 46 to ground. By controlling the switching rate or duty cycle of the transistor 44, that is the period of time the transistor is conducting and the period of time the transistor is non-conducting, the energization of the primary winding 22 is controlled.

The control of the duty cycle of the transistor 44 is controlled by the switching power supply controller control integrated circuit 48 which in turn controls a transistor 50 coupled to the base electrode of transistor 44. The switching power supply controller integrated circuit 48 includes RC networks including capacitor 54 which in conjunction with a resistor 56 controls the frequency of oscillation of the device 48 and capacitor 52 which in conjunction with resistor 53 controls the gain of the error amplifier. Transistor 50 and its related resistors 58, 60 and 62 form an amplifier which provides the control of transistor 44. It has been discovered that by stepping-up the voltage at the input terminal Vcc, the switching supply can be maintained in operation while the input voltages from energy storage 18 drop below the minimum required voltage level to properly operate the device 48. This provides enhanced protection for the meter operation under low power conditions and increases the systems effeciency by allowing a higher utilization of the energy storage and by thus allowing a longer period of time for the energy to drive other critical meter functions, such as transferring the information into a non-volatile memory and completing a print cycle rather than maintaining the operability of the switching power supply. A circuit including capacitor 64 diodes 66 and 68 along with Zener diode 70 and electrolytic capacitor 72 are provided to step up the voltage applied to the input terminal Vcc of device 48. Junction 74 under control of the switching transistor 44 oscillates between the input voltage from the energy storage device (+24 volts DC after energy storage device 18 is fully charged) and the negative voltage reflected back from the secondary winding into the primary winding 22 when transistor 44 is turned off. Junction 76 follows the voltage changes of junction 74. During negative going portions of the cycle at junction 76, diode 66 is forward biased and charge current flows through diode 66 to add charge to capacitor 64. At this time diode 68 is reverse biased. At the positive going transitions of junction 76, current flows out of capacitor 64 through diode 68 to charge electrolytic capacitor 72. The resistor 71 and Zener diode 70 limit the voltage which develops across electrolytic capacitor 72. In this manner, the DC operating voltage applied to input terminal Vcc of the switching power supply controller integrated circuit 48 is stepped-up above the level of the input voltage being supplied from energy store 18. Controller 48 has a maximum voltage rating of 40 V. Thus, Zener diode 70 is chosen to have a slightly lower rating, for example 36 V.

During the portion of the duty cycle that transistor 44 is non-conducting, the voltage developed at junction 74 is the voltage which is reflected back from the secondary into the primary winding 22 as a result of the collapsing magnetic flux in the transformer core 77 which in turn is a reflection of the voltage developed in the secondary winding 26. The voltage developed at junction 74 when transistor 44 is non-conducting represents a feedback of the voltage condition of the secondary circuit. This secondary winding voltage condition information is utilized to control the switching power supply controller integrated circuit 48 as will hereinafter be described to regulate the duty cycle of transistor 44.

The voltage developed at junction 74 is proportional to the turns ratio of the primary winding to the secondary winding and to the secondary voltage. A suitable transformer for use in the present circuit may be constructed using any core suitable for switching power supplies such as ferrite or molypermalloy cores manufactured by Magnetics, Arnold, Ferroxcube or others. To minimize stray magnetic fields which could affect electronic components within the meter, a toroidal transformer is preferred.

When the voltage at junction 74 is negative, diode 78 is forward biased and electrolytic capacitor 80 is charged. Thus, the voltage developed at junction 82 is proportional to the voltage developed at junction 74 and to the voltage conditions in the secondary winding. The junction 82 is coupled via a capacitor 84 and potentiometer 86 to the positive one of the pair of error input terminals for device 48. The other negative error input terminal for device 48 is coupled via a voltage divider including resistors 88 and 90 to the reference voltage output terminal of the device 48. The voltage divider is used to bias an error voltage differential amplifier within device 48 to the differential amplifier optimum operating level. A capacitor 92 is provided to filter transients which may occur.

As the voltage in the secondary winding increases the voltage at junction 82 will decrease. This in turn will cause an error signal (as compared to the device reference voltage) to be applied to the chip switching power supply controller integrated circuit 48. As a result the duty cycle device is shortened so that transistor 44 remains non-conducting for a greater portion of the cycle. Conversely, should the voltage in the secondary winding decrease, the voltage at junction 82 will increase causing device 48 to drive transistor 50 and thereby transistor 44, such that the conducting portion of the duty cycle increases. As a result, the amount of time that transistor 44 is conducting is increased. In this way, the voltage developed in the secondary winding is regulated without the need for additional feedback components as previously noted.

Referring now to the circuit coupled to the secondary winding 26, three different output voltages are provided. A plus 5 volt DC output, a minus 12 volt DC output and a minus 30 volt DC output. These voltages are utilized to operate the various circuit components within the meter. For example, the voltages may be applied to the non-volatile memory and to the microcomputer as is shown in pending U.S. Patent Application Ser. No. 06-447,913, filed Dec. 8, 1982, by Alton B. Eckert and Easwaran C. N. Nambudiri for INITIALIZING THE PRINTWHEELS IN AN ELECTRONIC POSTAGE METER and in U.S. Patent Application Ser. No. 06-447,815 filed Dec. 8, 1982, by Danilo P. Buan and Alton B. Eckert for STAND ALONE ELECTRONIC MAILING MACHINE. Both applications are assigned to Pitney Bowes Inc.

The plus 5 volt DC is developed by virtue of a rectifier circuit which includes diode 94 and electrolytic capacitor 96. A switch 98 may be provided which is coupled to a break away door diagrammatically shown at 100. When the door is opened, the switch 98 is open thereby removing the plus 5 volt output from the non-volatile memory and precluding information from being erased, read or written into the non-volatile memory.

A comparator amplifier 102 is provided in the secondary winding. The output of the comparator amplifier 102 is coupled to the microprocessor 30 to initiate a power down routine when power fails or is removed from the input to the meter. This allows the critical accounting information to be transferred in an orderly fashion into the non-volatile memory and avoids the loss of critical information which could be irrevocably lost. The secondary circuit includes a diode 104 coupled via a potentiometer 106 to the positive input of the comparator amplifier 102. A capacitor 108 is provided for filtering of transients accross the resistor 106. The negative terminal of the comparator amplifier 102 is connected via a resistor 110 to the plus 5 volt DC developed at diode 94. A feedback resistor 112 is provided for a suitable hysteresis. A suitable device for the comparator amplifier 102 is a LM2903 manufactured by National Semiconductor Corporation and others.

The voltage at junction 114 reflects the voltage level at junction 74 when transistor 44 is conducting. This in turn is a representation of the voltage level available from energy store 18. If the voltage drops below a pre-determined level, as for example 20 volts, the voltage at junction 114 will drop to a level such that the output from comparator amplifier 102 will switch from a high to a low. This will cause the microprocessor to enter into a power down routine. Diode 116 in conjunction with electrolytic capacitor 118 are coupled to the secondary winding 26 to provide the rectified minus 12 volt DC output. Similarly, a diode 120 in conjunction with an electrolytic capacitor 122 are coupled to the secondary winding 26 to provide the minus 30 volt DC output. It should be noted that a logic common 124 is provided in the secondary winding circuit. The logic common provides a common return of points for the circuits connected into the secondary winding without the need to return these components to ground and thereby coupling the circuits through the ground return path to the primary winding circuit.

While the invention has been disclosed and described with reference to a single embodiment thereof, it will be apparent, as noted above, that variations and modifications may be made therein. It is, thus, intended in the following claims to cover each variation and modification as falls within the true spirit and scope of the present invention.

What is claimed is:

1. In an electronic postage meter having means for printing postage and microcomputer means for monitoring the printing of postage by said printing means and said microcomputer, means for supplying a source of operating potential external to said secure housing means, a system for energizing said microcomputer means, comprising:

transformer means having a primary winding and a secondary winding, said transformer means mounted within said secure housing means, said secondary winding operatively connected to said microcomputer means;

controlling means coupled to said primary winding and to said external source of operating potential for controlling the voltage applied to said primary winding, said controlling means operable to switch the voltage applied to said primary winding between a first condition wherein said primary winding is energized and a second condition wherein said primary winding is not energized, said controlling means including period varying means operable to vary the period of time said primary winding is energized and the period of time said primary winding is deenergized; said controlling means also including a terminal that is energized by a predetermined source of operating voltage and energizing means coupled to said controlling means for energizing said terminal at a voltage which is greater than said predetermined voltage to allow for proper operation of the controlling means; and means coupled between said primary winding and said varying means of said controlling means for operating said varying means to vary the period of time said primary winding is energized and the period of time said primary winding is de-energized in response to a voltage established in said primary winding of said transformer during said period of time said transformer is de-energized.

2. A system as defined in claim 1 wherein said operating means provides the only source of information to said controlling means of the power condition in said secondary winding and wherein said operating means is not connected to said secondary winding except through said transformer means.

3. A system as defined in claim 1 wherein said controlling means is a switching type integrated circuit regulator.

4. A system as defined in claim 1 wherein said transformer includes a magnetic core.

5. A system as defined in claim 1 wherein said magnetic core is comprised molypermalloy powder type material.

6. In an electronic postage meter of the type having means for printing postage and microcomputer means coupled to said printing means, said printing means and said microcomputer means mounted within a secure housing means, and a source of operating potential external to said secure housing means, a system for energizing said microcomputer means, comprising:

transformer means having a primary winding and a secondary winding, said transformer means mounted within said secure housing and said secondary winding coupled to said microcomputer means;

controlling means coupled to said primary winding for controlling the energization of said primary winding of said transformer means, said controlling means having a terminal that is energized at a predetermined voltage to energize said controlling means to operate;

means connected between said external source of operating potential and said controlling means for operating the controlling means; and means mounted within said secure housing means and connected to said operating means and said controlling means terminal for applying a voltage to said controlling means terminal in excess of said predetermined voltage to allow for the proper operation of the controlling means.

7. A system as defined in claim 6, wherein said controlling means comprises a switching type power regulator device.

8. A system as defined in claim 7 wherein said operating means coupled to said controlling means terminal comprises a step-up voltage generating means.

9. A system as defined in claim 6 wherein said operating means includes energy storage means for providing a source of operating potential for said controlling means when said external source of operating power is removed.

10. A system as defined in claim 9 wherein said operating means comprises a step-up voltage generating means for stepping-up the voltage developed in said energy storage means.

* * * * *